United States Patent
Koraitim et al.

(10) Patent No.: US 6,370,117 B1
(45) Date of Patent: Apr. 9, 2002

(54) CHANNEL ALLOCATION METHODS IN A COMMUNICATION NETWORK AND CORRESPONDING SYSTEM

(75) Inventors: Héba Koraitim, Paris; Samir Tohme, Gif-sur-Yvette, both of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/160,003

(22) Filed: Sep. 24, 1998

(30) Foreign Application Priority Data

Sep. 30, 1997 (EP) .............................. 97402280

(51) Int. Cl.⁷ ................................................. H04J 3/16
(52) U.S. Cl. ........................................ 370/232; 370/412
(58) Field of Search .................................. 370/232, 233, 370/234, 253, 412, 415, 429, 458

(56) References Cited

U.S. PATENT DOCUMENTS

| | | | | |
|---|---|---|---|---|
| 5,460,620 A | * | 10/1995 | Sriram | 370/412 |
| 5,463,620 A | * | 10/1995 | Sriram | 370/412 |
| 5,996,019 A | * | 11/1999 | Hauser et al. | 709/235 |
| 6,046,981 A | * | 4/2000 | Ramamurthy et al. | 709/232 |
| 6,192,049 B1 | * | 2/2001 | Sohraby | 370/389 |

OTHER PUBLICATIONS

"Fixed–And Movable–Boundary Channel–Acces Schemes for Integrated Voice/Data Wireless Networks", by Jeffrey E. Wieselthier, IEEE Trans. on comm., vol. 43, No. 1, Jan. 1995.

\* cited by examiner

*Primary Examiner*—Melvin Marcelo
*Assistant Examiner*—Alexander O. Boakye
(74) *Attorney, Agent, or Firm*—Daniel J. Piotrowski

(57) ABSTRACT

The invention relates to a resource allocation method and system making use of a dynamically controlled boundary policy to satisfy the quality of service parameters guaranteed by the system for two traffic classes (a constant bit rate traffic, and a bursty data one also called VBR traffic) having to share a communication channel divided into frames. The boundary position (BP) between the traffic sub-frames and hence the allocation decision itself are defined by a resource allocator (23) for each frame, after monitoring the filling level of traffic request queues (21, 22).

4 Claims, 2 Drawing Sheets

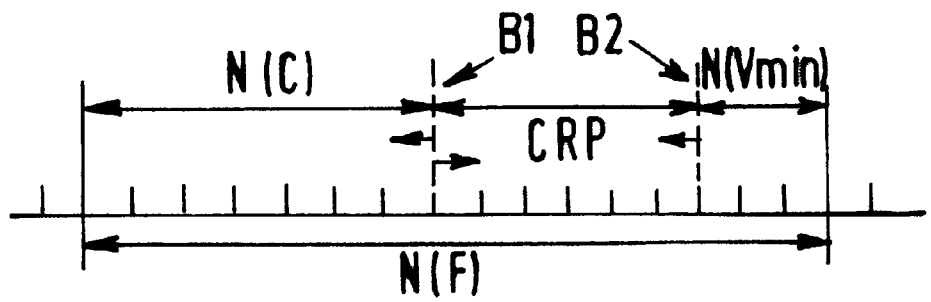
FIG.1
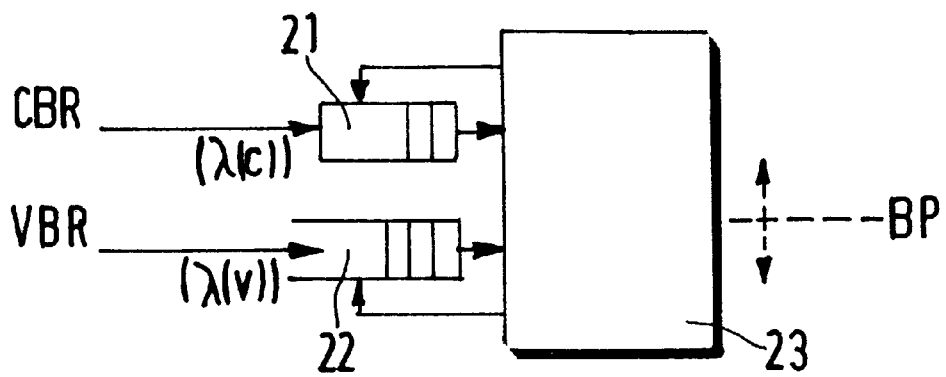
FIG.2
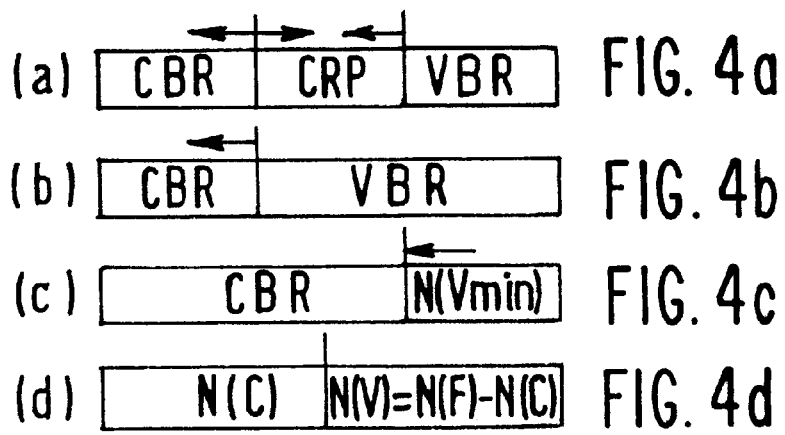
FIG. 4a
FIG. 4b
FIG. 4c
FIG. 4d

CHANNEL ALLOCATION METHODS IN A COMMUNICATION NETWORK AND CORRESPONDING SYSTEM

BACKGROUND OF THE INVENTION

The present invention relates to a method of allocating channel slots to waiting calls coming from a plurality of user stations for an integration of constant and variable bit rate (CBR and VBR) traffic into a communication channel divided into frames each of which includes N(F) time slots. It also relates to a corresponding allocation system. This invention may be for instance implemented in a satellite network including VSAT terminals.

Satellite networks, that offer individual users a direct access to the satellite transponder resources from a VSAT ( Very Small Aperture Terminal), are expected to play an important role in the multimedia communications. Since exchanging messages between a user terminal and the network control center costs a lot in terms of delay, the resource allocation policy for integrating different traffic types represents a major aspect in designing a satellite network able to support multimedia traffic generating applications. Channel access and bandwith attribution depend, to a large extent, on the type of traffic to the transferred, and the variation in traffic characteristics is therefore an essential factor in the choice of the resource allocation policy.

For synchronous traffic, that corresponds to time-sensitive applications generating stream traffic for long durations, its periodic nature and its time sensitivity necessitate the allocation of a fixed channel resource for the duration of a call, in a connection-oriented mode of service. The attribution of a channel for the whole call is particularly essential in the presence of the large satellite propagation delay, in order to limit the jitter variations for such real-time traffic. The synchronous traffic can then be attributed a constant bit rate class of service, as it occupies the same bandwidth resource during the whole call duration.

A synchronous traffic, on the other hand, corresponds to these situations where for instance interactive terminals, occasionally generating short bursts, can be admitted in the system for the duration of a burst, on a burst-by-burst reservation basis, and said traffic can then be supported on said basis in a connection-less mode of service. The burst can be mapped to a non-real time variable bit rate class of service, the non-real time nature arising from the fact that the reservation delay for an arriving burst is large compared to terrestrial networks (moreover, the resulting jitter cannot be guaranteed, since it largely depends on the access protocol applied and the variations of the link loading conditions).

An efficient resource allocation policy is therefore necessary to accomodate these service classes and at the same time to satisfy the quality of service required by each traffic type. In the satellite context, several strategies have been proposed to facilitate the use of the same channel for transmitting different traffic types. Generally the satellite uplink channel is subdivided into TDMA (Time Division Multiple Access) frames of fixed length. These frames are in turn divided into a given number L of time slots allocated to the different traffic types, either in a fixed manner (fixed boundary strategy) or in a variable one (movable boundary strategy).

With the fixed boundary strategy, each traffic type has a same number of time slots permanently allocated to it, and hence encounters no competition from other types to share its resources. This strategy may be inefficient in case resources are not fully utilized and therefore wasted by a given traffic type without any opportunity to be used by other ones.

Another strategy partially overcomes this drawback by allowing a limited sharing of resources: the so-called movable boundary strategy, described for instance in the document "Fixed- and movable boundary channel-access schemes for integrated voice/data wireless networks", J. E Wieselthier and A. Ephremides, IEEE Transactions on Communications, vol. 43, n°1, January 1995, pp.64–74, and according to which short data messages can be allocated extra channels if they are not used by the stream traffic, but are however preempted by the latter if necessary.

Such a strategy, found to achieve a reduction of queueing delay for short data messages compared to the fixed boundary strategy (and therefore to achieve a better channel utilization), is now more precisely explained.

In a conventional movable boundary strategy, each frame is subdivided into two compartments:a CBR sub-frame, and a non-real time variable bit rate sub-frame (called NRT-VBR, or VBR, sub-frame). Since CBR calls occupy the channel resources for longer periods compared to the data bursts durations, CBR resources available at low loading conditions can be allocated to bursty data (arriving CBR requests continue however to have a higher priority in their own sub-frame): the boundary separating the two sub-frames can move inside the CBR one to allocate to VBR traffic the available time slots, but moves back to its position as CBR traffic increases (i.e. a CBR time slot that was borrowed for VBR traffic reverts to its original status as a CBR time slot immediately when needed for this purpose). This has the advantage of reducing the VBR traffic average delay, whereas the CBR performance is left unaffected. In contrast, the CBR traffic is not authorized to use a VBR time slot from the VBR sub-frame, since this. slot would then become unavailable to VBR traffic for the entire duration of the call.

SUMMARY OF THE INVENTION

An object of the invention is to propose an improved method of allocating time slots allowing to enhance the quality of service offered to CBR connections.

To this end the invention relates to a method as described in the preamble of the description and wherein, under normal loading conditions for both traffic types, each frame is subdivided thanks to two frontiers into a constant bit rate (CBR) traffic sub-frame composed of N(C) slots, a variable bit rate (VBR) data traffic sub-frame composed of N(Vmin) slots and, between them, a sub-frame called common resource pool (CRP) and composed of the (N(F)–N(C)–N (Vmin)) remaining slots of the frame, said allocation method then comprising the following steps:

(a) as the VBR traffic loading increases over that of CBR traffic, the boundary between them moves inside the CRP and the CBR sub-frame in order to include unallocated CBR channels;

(b) as the CBR traffic goes up, at small VBR loads said boundary moves in the CRP towards the VBR sub-frame, said displacement being limited by the minimum number of resources N(Vmin) permanently reserved for VBR traffic;

(c) under high loading conditions for both traffic types, CBR traffic resources are limited to N(C), while the remaining resources N(V)=N(F)–N(C) in the frame are available to VBR traffic.

This method, evaluated in a satellite environment, is more convenient than the conventional movable boundary strategy to integrate CBR and VBR traffic at lower loads of the latter, since it allows in the common time slot part mutual resource sharing, by dynamically adapting the allocation decision to different traffic load variations. The advantage of this method, carried out at the beginning of each frame in order to adapt it to said network loading conditions, is that it reduces CBR traffic blocking probability and call set-up delay at low VBR loads, because it allows CBR traffic to take advantage of the available resources on the frame at the same time of guaranteeing a minimum for the VBR traffic. The VBR queuing delay is also reduced at low CBR loading conditions. The proposed scheme however converges to the conventional movable boundary strategy at high load of both traffic types.

Another object of the invention is to propose an allocation system for carrying out said method.

To this end, the invention relates to a system for allocating channel slots to waiting calls coming from a plurality of user stations for an integration of constant and variable bit rate (CBR and VBR) traffic into a communication channel divided into frames each of which includes N(F) time slots, characterized in that it comprises a first finite length CBR queue, provided for storing arriving CBR call connections, a second infinite queue, provided for storing arriving VBR messages, and a frame allocation controller, provided for monitoring the filling level of each of the two queues at the beginning of control periods respectively associated to said frames, each frame being, under normal loading conditions for both traffic types, subdivided thanks to two frontiers into a CBR traffic sub-frame composed of N(C) slots, a VBR traffic sub-frame composed of N(Vmin) slots and, between them, a sub-frame called common resource pool (CRP) and composed of the (N(F)−N(C)−N(Vmin)) remaining slots of the frame, and an allocation method being then carried out (a) as the VBR traffic loading increases over that of CBR traffic, the boundary between them moves inside the CRP and the CBR sub-frame in order to include unallocated CBR channels;

(b) as the CBR traffic goes up, at small VBR loads said boundary moves in the CRP towards the VBR sub-frame, said displacement being limited by the minimum number of resources N(Vmin) permanently reserved for VBR traffic (c) under high loading conditions for both traffic types, CBR traffic resources are limited to N(C), while the remaining resources N(V)=N(F)−N(C) in the frame are available to VBR traffic.

In this system, the step (b) is preferably organized according to the following steps (b1) before channels are allocated for the waiting calls from the CRP, the length of the second queue is monitored:
(i) if said length is less than a given threshold, CBR calls are granted access in the CRP sub-frame;
(ii) if said length exceeds said thresold, CBR requests are denied access to the CRP sub-frame, and are made to wait for a release of resources either in the CBR sub-frame or in the CRP sub-frame only if said queue length goes below said threshold;

(b2) if the first queue is completely filled when a new CBR call request arrives, said request is blocked and erased from the system.

In an advantageous embodiment of said system, the value of said threshold dynamically varies as a function of the number of CRP resources allocated to CBR traffic, said threshold being reduced as said number increases.

BRIEF DESCRIPTION OF THE DRAWINGS

The present invention will now be described in further detail with reference to the accompanying drawings, in which:

FIG. 1 shows a frame structure according to the invention, with two movable boundaries between three kinds of time slots;

FIG. 2 illustrates an embodiment of an allocation system according to the invention and FIG. 3 is a flow chart illustrating the allocation method that is carried out;

FIG. 4 shows the frame structure and boundary position under variable loads.

Figure 3:
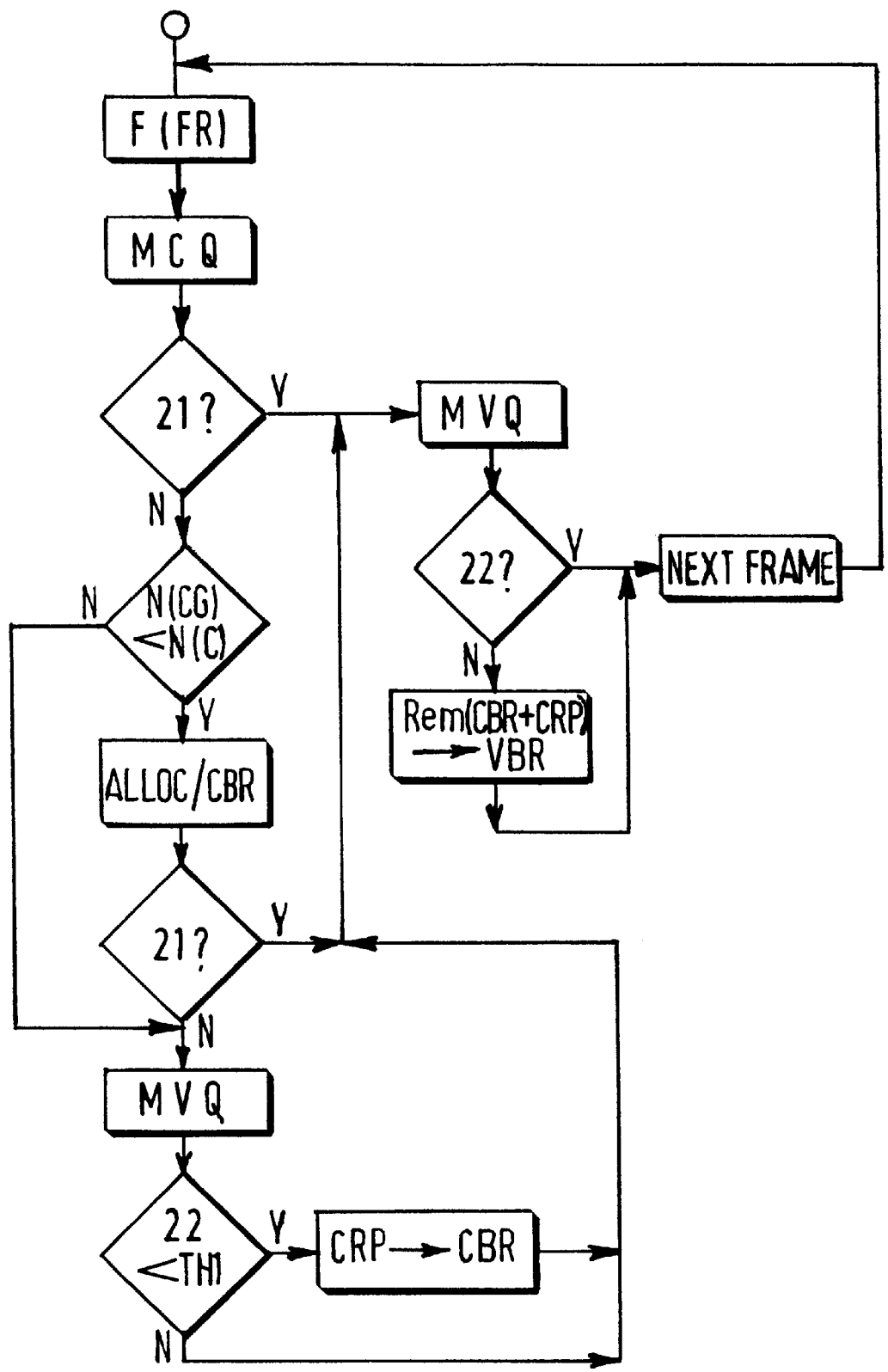

For the sake of clarity, the allocation method according to the invention, a detailed explanation of which is now given, will be called in the description the Double Movable Boundary Strategy, or "DMBS". A framed structure divided into N(F) time slots is shown in FIG. 1 (when dealing with transmission of messages between stations interconnected via a communication channel, a feedback downstream connection, or channel, generally exists, but the invention, concerning the upstream channel, applies whatever said downstream connection). Each frame of N(F) slots is itself subdivided into three compartments a CBR traffic sub-frame, composed of N(C) time slots, where N(C) represents the total resources available for CBR calls, at normal and high VBR loading conditions, and is chosen so as to achieve the required call blocking probability guaranteed by the system;

a non-real time variable bit rate (NRT−VBR) traffic sub-frame, or VBR sub-frame, composed of N(Vmin) time slots, where N(Vmin) represents the minimum number of resources dedicated to VBR traffic under all loading conditions;

a common resource pool (CRP), composed of the remaining time slots (N(F)−N(C)−N(Vmin)) of the frame.

DESCRIPTION OF THE PREFERRED EMBODIMENTS

As shown in FIG. 1, boundaries between the different kinds of slots exist. The positions of said boundaries (B1, B2) are defined by means of channel allocation decisions taken for each frame during a control period associated to said frame. The frame duration is chosen to satisfy the periodicity requirements of CBR calls, and one slot per frame is attributed on a reservation basis to each CBR connection and to each VBR message. The allocation method and the corresponding allocation system will be described with reference to FIGS. 2 and 3.

The allocation system considered in FIG. 2 is assumed to include a large number of terminals competing for channel resources. As previously seen, two types of terminals are here considered. The first one is running a stream traffic-generating application requesting CBR connections, and the second one is running an application which generates short data bursts and request resources for the burst duration. CBR call requests, referenced "CBR" traffic, arrive according to a Poisson process, with an arrival rate of □(c) calls per second, while data messages, referenced "VBR" traffic, arrive according to a similar one, with an arrival rate of □(v) packets per second. The length of a data message is equal to the length of a time slot, and the mean service duration of CBR calls is much greater than that of VBR data messages (the former lies in the order of minutes, while the latter is of the order of micro- to milliseconds, depending on the frame duration and the number of time slots per frame).

The frame resource allocation system shown in FIG. 2 comprises a finite length CBR queue 21, provided for storing arriving CBR call connection requests, an infinite queue 22, provided for storing arriving bursty data messages (VBR traffic), and a frame resource allocator 23, that is provided for receiving the outputs of said queues 21 and 22 and carries out the "DMBS" method (i.e. it organizes the attribution of resources to arriving traffic according to the present invention), according to the DMBS controller operation flow chart of FIG. 3.

The allocator 23 first receives the traffic request and checks the required service class for directing said request to the corresponding service queue:CBR connection requests are stored in the queue 21, whose length is generally determined as a function of the maximum allowed call set-up delay tolerated by the service (the CBR buffer length is finite in order to limit the call requests waiting delay:if the queue is completely filled when a new CBR connection request arrives, the call is blocked and exits the allocation system), while data burst reservation requests are directed to the queue 22 to wait for resource availability. The filling level of each of these two queues 21 and 22 is then monitored at the beginning of each control period and, as soon as the allocation decision is taken following said monitoring operation, the allocator 23 broadcasts the information to all terminals.

The allocation controller procedure at the beginning of each frame is controlled at the frequency F(FR) of the frames, and according to the procedure as indicated in FIG. 3. The queue 21 (CBR traffic buffer) is first monitored (" monitor CBR queue", or MCQ) to see if there are any waiting connection demands.

After having verified (first test "21 ?") that the queue 21 is not empty (reply N), if the number of ongoing calls N(CG) is lower (reply Y) than N(C), these waiting calls are assigned slots on the CBR sub-frame (ALLOC/CBR). If there are still waiting call requests (second test "21 ?") in the queue 21 after the number of allocated CBR time slots reaches N(C), the queue 22 (VBR traffic buffer) is then monitored (" monitor VBR queue", or MVQ). If the filling level of the latter is less than a given threshold TH1 (reply Y), a waiting call can be assigned (CRP →CBR) a time slot from the CRP (as a measure of protection for the bursty data of the VBR traffic, only one time slot, or only a given limited number of time slots, can be allocated to CBR traffic from the CRP at the beginning of each control period, in order to avoid the building up of a large data queue during long CBR call holding times). If however, the filling level of the queue 22 exceeds TH1 (reply N), the waiting call request is not satisfied in this frame and remains in the queue 21 (or is blocked and erased from the system if said queue 21 is completely filled).

On the contrary, when the queue 21 is empty (reply Y to the first test "21 ?"), i.e. when there are no call requests waiting in the CBR traffic buffer, all unoccupied channels in both the CRP and the CBR sub-frame are made available (Rem(CBR+CRP)→NRT–VBR, "Rem" meaning the remaining slots in CBR and CRP) to data messages waiting in the queue 22 (if not empty:"22 ?").

The corresponding variations in the boundary position BP (an example of position of this boundary position BP is schematically illustrated in FIG. 2, at the output of the allocator 23) as a function of the traffic loading conditions are then illustrated in FIG. 4:

(a) under normal loading conditions for both traffic types, the frame looks as in FIG. 4a;

(b) as VBR traffic loading increases over that of CBR traffic, the boundary moves inside the CRP and may enter the CBR subframe for bursty data to profit from all unallocated CBR time slots of the frame (FIG. 4b), as in the case of the conventional movable boundary strategy;

(c) if on the contrary CBR traffic goes up, at small VBR traffic loads the boundary moves progressively in the CRP towards the VBR sub-frame, the boundary motion being limited (as shown in FIG. 4c) by the minimum number of resources N(Vmin) permanently reserved for VBR traffic;

(d) under high loading conditions for both traffic types, CBR resources are limited to N(C), while the rest of the resources on the frame are available to the bursty data of the VBR traffic (as shown in FIG. 4d), and equal to N(V)=N(F)–N(C).

At the end of the procedure for a given frame, a similar one is repeated for the following frame (connection NEXT-FRAME from the output of the test "22 ?" to the start input of the procedure, in FIG. 3), and so on.

It should be noted that the invention is obviously not limited to the described embodiments:modifications based on these embodiments may be proposed without departing from the scope of the invention. It may be mentioned, for instance, that the value of the threshold TH1 determining the CBR call admission decision has a great influence on the performance of the system and consequently the efficiency of the "DMBS" method. A low value of TH1 favors bursty data (VBR traffic) over CBR traffic, by reducing the waiting delay of said data in the queue 22 at the expense of risking a rise in the blocking probability and call set-up delay for CBR traffic. On the other hand, a high value of TH1 increases the chance of accepting a CBR reservation request while sacrificing the length of the queue 22 and hence mean data delay.

The choice of this value of TH1 may then depend on the type of offered services and the quality of service parameters guaranteed by the network. Moreover, said value can be either fixed or variable, depending on the changing traffic types and requirements. A dynamic change of this threshold may render the method more flexible in dealing with a larger variety of service classes. Furthermore, for the same supported traffic, a dynamic threshold may be used to provide extra protection for data traffic.

Practically, such a dynamic threshold aspect may be achieved by reducing the threshold value TH1 as the number of allocated channels to CBR traffic from the CRP sub-frame increases. One possible expression to dynamically vary the threshold value as a function of the number of CRP resources allocated to CBR traffic is:

$$L(DTh) = \frac{L(ITh) \cdot N(C)}{N(C) + N(A)} \quad (1)$$

with

L(DTh)=calculated dynamic threshold value;
L(ITh)=initial fixed threshold value;
N(A)=number of allocated CRP resources to CBR calls.

An alternative formula for determining the value of the threshold can be the following:

$$L(DTh) = \frac{L(ITh)}{N(A)+1} \quad (2)$$

This second formula seems to lead to a slightly better performance of the system.

What is claimed is:

1. A method of allocating channel slots to waiting calls coming from a plurality of user stations, for an integration of constant and variable bit rate (CBR and VBR) traffic into a communication channel divided into frames each of which includes N(F) time slots, wherein, under normal loading conditions for both traffic types, each frame is subdivided into a CBR traffic sub-frame composed of N(C) slots, and a VBR traffic sub-frame composed of N(Vmin) slots and, between them, a sub-frame called common resource pool (CRP) and composed of the (N(F)–N(C)–N(Vmin)) remaining slots of the frame, said allocation method then comprising the following steps:

(a) as the VBR traffic loading increases over that of CBR traffic, a boundary between them moves inside the CRP and the CBR sub-frame in order to include unallocated CBR channels;

(b) as the CBR traffic goes up, at small VBR loads said boundary moves in the CRP towards the VBR sub-frame, wherein any displacement is limited by the minimum number of resources N(Vmin) permanently reserved for VBR traffic;

(c) under high loading conditions for both traffic types, CBR traffic resources are limited to N(C), and remaining resources N(V)=N(F)–N(C) in the frame are available to VBR traffic.

2. A system for allocating channel slots to waiting calls coming from a plurality of user station, for an integration of constant and variable bit rate (CBR and VBR) traffic into a communication channel divided into frames each of which includes N(F) time slots, characterized in that it comprises a first finite length CBR queue, provided for storing arriving CBR call connections, a second infinite queue, provided for storing arriving VBR messages, and a frame allocation controller, provided for monitoring a filling level of each of the two queues at a beginning of control periods respectively associated to said frames, each frame being, under normal loading conditions for both traffic types, subdivided into a CBR traffic sub-frame composed of N(C) slots, and a VBR traffic sub-frame composed of N(Vmin) slots and, between them, a sub-frame called common resource pool (CRP) and composed of the (N(F)–N(C)–N(Vmin)) remaining slots of the frame, and an allocation method being then carried out according to the following steps (a) as the VBR traffic loading increases over that of CBR traffic, a boundary between them moves inside the CRP and the CBR sub-frame in order to include unallocated CBR channels;

(b) as the CBR traffic goes up, at small VBR loads said boundary moves in the CRP towards the VBR sub-frame, wherein any displacement is limited by the minimum number of resources N(Vmin) permanently reserved for VBR traffic;

(c) under high loading conditions for both traffic types, CBR traffic resources are limited to N(C), and remaining resources N(V)=N(F)–N(C) in the frame are available to VBR traffic.

3. A system according to claim 2, wherein the step (b) comprises the following sub-steps:

(b1) before channels are allocated for the waiting calls from the CRP, the length of the second queue is monitored:

(i) if said length is less than a given threshold, CBR calls are granted access in the CRP sub-frame;

(ii) if said length exceeds said thresold, CBR requests are denied access to the CRP sub-frame, and are made to wait for a release of resources either in the CBR sub-frame or in the CRP sub-frame only if said queue length goes below said threshold;

(b2) if the first queue is completely filled when a new CBR call request arrives, said request is blocked and erased from the system.

4. A system according to claim 3, wherein the value of said threshold varies as a function of CRP resources allocated to CBR traffic.

* * * * *